Feb. 26, 1963   W. P. OEHLER ET AL   3,079,174
HITCH DEVICE FOR A PLURALITY OF IMPLEMENTS
Filed Sept. 29, 1959   5 Sheets-Sheet 4

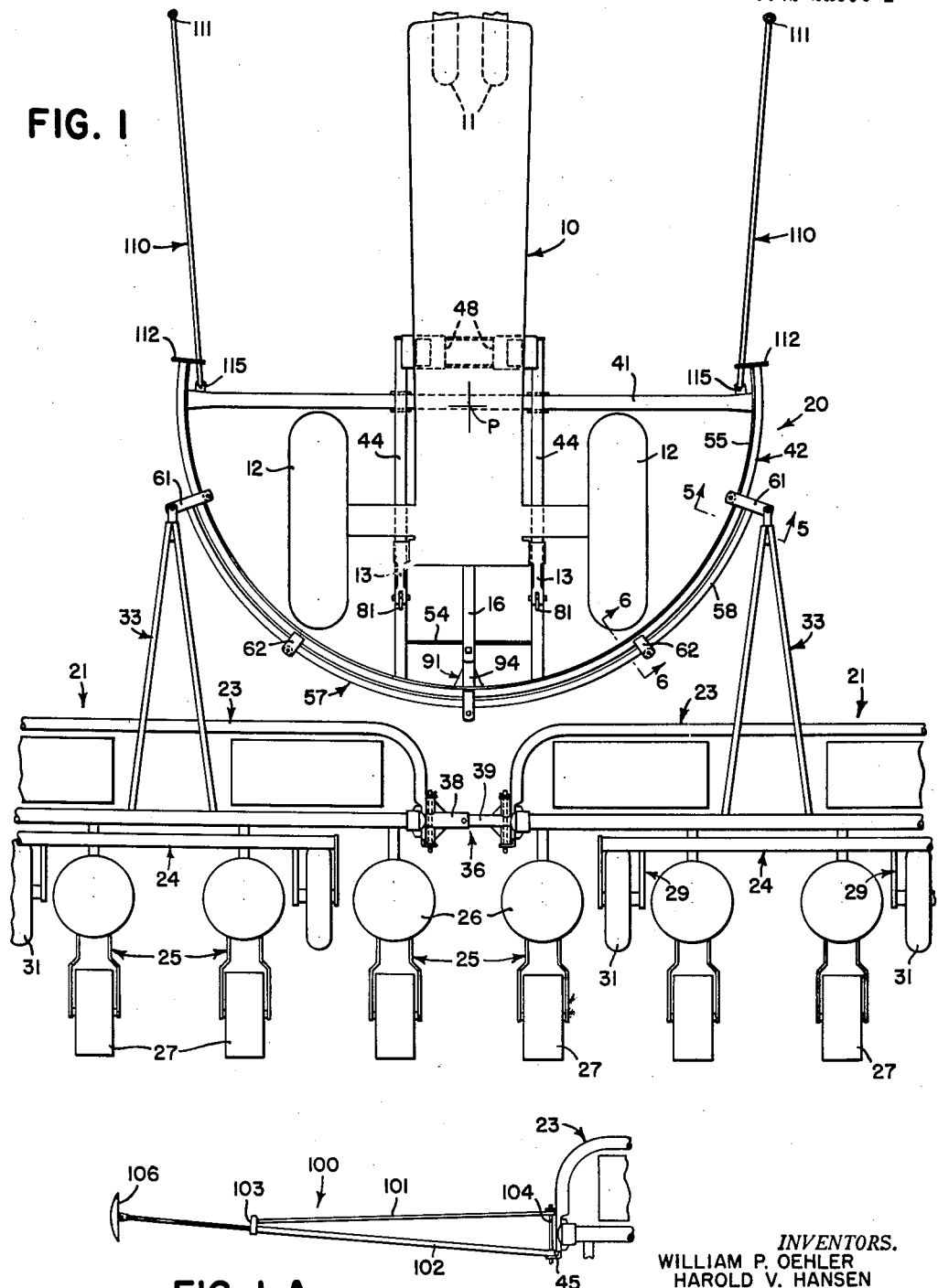

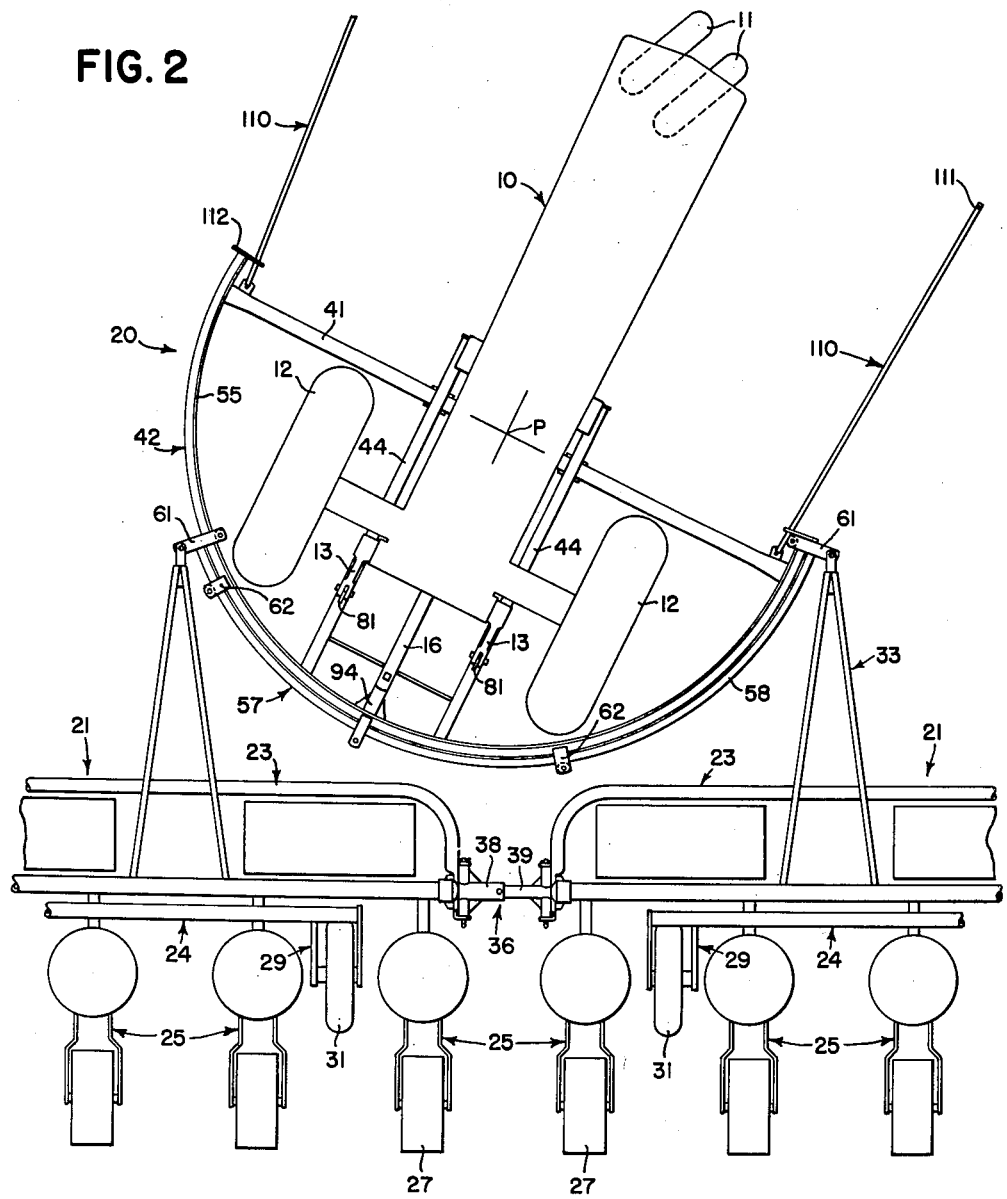

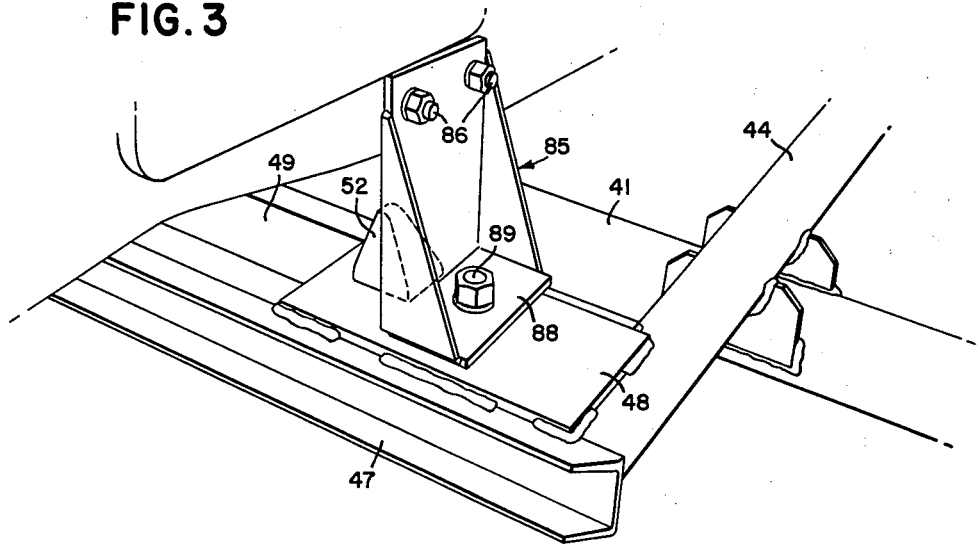
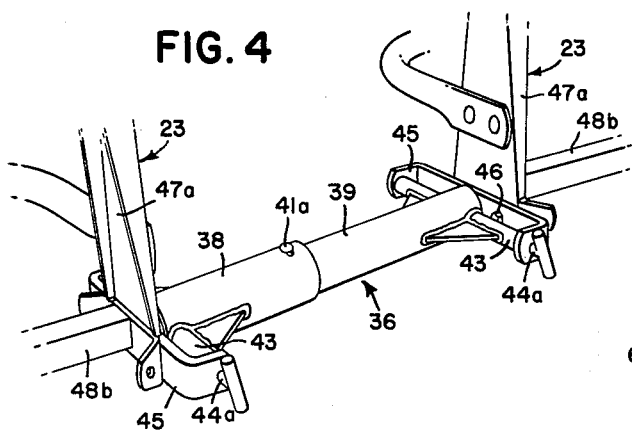
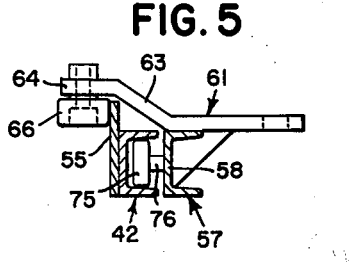
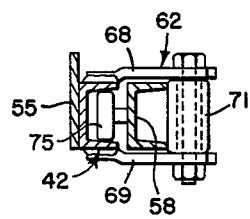

INVENTORS.
WILLIAM P. OEHLER
HAROLD V. HANSEN
BY
*Roger C. Johnson*
ATTORNEYS

Feb. 26, 1963  W. P. OEHLER ET AL  3,079,174
HITCH DEVICE FOR A PLURALITY OF IMPLEMENTS
Filed Sept. 29, 1959  5 Sheets-Sheet 5

INVENTORS.
WILLIAM P. OEHLER
HAROLD V. HANSEN
BY
Roger C. Johnson
ATTORNEYS

United States Patent Office 3,079,174
Patented Feb. 26, 1963

3,079,174
HITCH DEVICE FOR A PLURALITY
OF IMPLEMENTS
William P. Oehler and Harold V. Hansen, Moline, Ill., assignors to Deere & Company, Moline, Ill., a corporation of Delaware
Filed Sept. 29, 1959, Ser. No. 843,100
7 Claims. (Cl. 280—412)

The present invention relates generally to agricultural implements and more particularly to corn planers and the like.

The object and general nature of this invention is the provision of a multi-row planter, preferably made up of two conventional planters arranged in side by side relation to provide an outfit that plants twice as many rows as one of the conventional planters when operated alone. More specifically, it is a feature of this invention to provide a multi-row planter implement by providing two conventional multi-row planters with new and improved hitch means whereby two of such conventional units may be conveniently hitched in side by side relation close behind the tractor so as to provide an easily maneuverable outfit.

A further important feature of this invention is the provision of new and improved hitch means whereby a pair of implement units may be connected in short coupled relation with respect to the propelling tractor by means that accommodates turning of the tractor with respect to the implements about a hitch point that lies forward of the rear wheels of the tractor. Preferably, such hitch means includes a hitch frame adapted to be connected to the tractor in rigid relationship and an arcuate hitch bar receiving the implement connections and shiftable along the rear arcuate portion of the hitch and relative to the tractor about a generally forwardly disposed hitch point. Further, an additional feature of this invention is the provision of new and improved hitch means that provides for readily connecting the hitch, with implements connected therewith, to the tractor with a minimum expenditure of time and effort.

These and other objects and advantages of this invention will be apparent to those skilled in the art after a consideration of the following description, taken in conjunction with the accompanying drawings, in which:

FIG. 1 is a plan view of the tractor and implement outfit incorporating the principles of the present invention and illustrating the same as including two four-row tractor implements connected to the propelling tractor in side by side relation so as to form, in effect, an eight-row implement.

FIG. 1A shows one of the planter-supported marker arms.

FIG. 2 is a view similar to FIG. 1, illustrating the ease by which the tractor may be turned or steered relative to the implements, whereby the outfit as a whole is easily and readily maneuverable, as when turning at the headlands, or when operating in other restricted spaces.

FIG. 3 is a fragmentary perspective view illustrating the connections between the front portion of the hitch frame and associated hitch brackets attached to the generally central portion of the tractor.

FIG. 4 is a fragmentary perspective view illustrating the center tie between the two implement units making up a multi-row implement of the present invention.

FIG. 5 is a fragmentary sectional view taken generally along the line 5—5 of FIG. 1.

FIG. 6 is a fragmentary sectional view taken along the line 6—6 of FIG. 1.

FIG. 7 is a fragmentary plan view similar to FIG. 1, showing the implements arranged in tandem relation for transport behind the tractor when moving from place to place, such as through narrow lanes, roads or highways, or through gates or the like.

Figure 7:
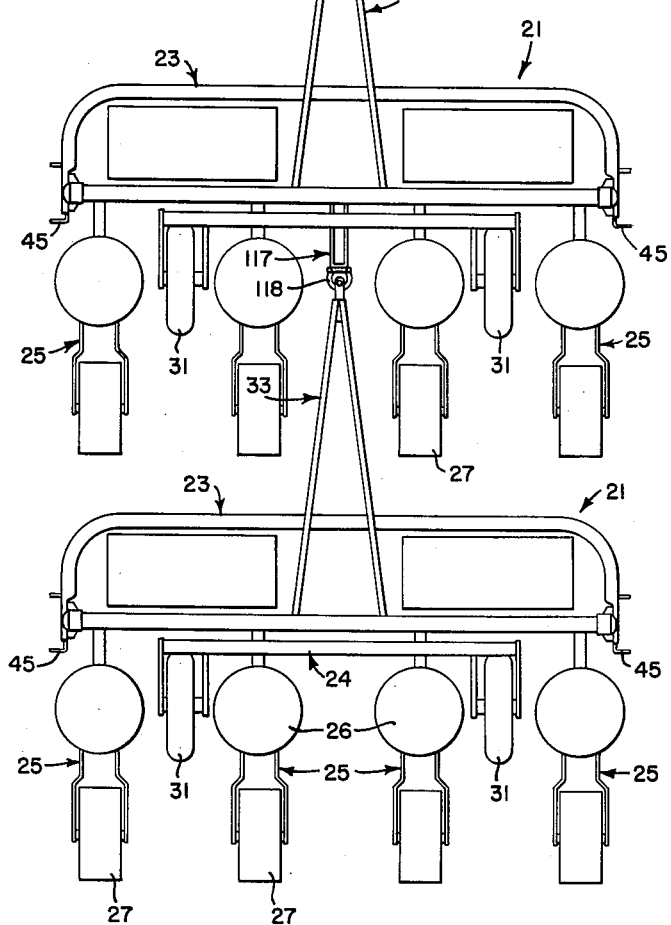

Referring first to FIG. 1, a propelling tractor that is conventional so far as this invention is concerned is indicated by the reference numeral 10 and includes front wheel means 11 and rear drive wheels 12. The tractor 10 also includes a pair of power operated lift arms 13 actuated by the usual power lift means carried on the tractor. The latter is also provided with the usual drawbar support 15 (FIG. 8) carried at the rear of the tractor and constructed to receive the usual laterally swingable drawbar 16. However, the latter may be locked against lateral swinging by a pair of bolts 17 insertable in registering apertures in the bars 18 that form portions of the tractor drawbar support 15. The rear end of the tractor drawbar 16 is provided with one or more openings that will be referred to in detail later. New and improved hitch frame means, indicated in its entirety by the reference numeral 20, is carried by the tractor 10 and is adapted to receive two four-row planters 21 arranged in side by side relation so as to form an eight-row planting outfit.

The planters 21 are per se conventional so far as this invention is concerned and hence a brief description of one of the planters will suffice for a complete disclosure. Each planter 21 includes a frame 23 supported on a wheel frame unit 24 and carrying four planting units 25. Each of the latter includes a hopper 26 and a press wheel 27, and the wheel frame 24 carries a pair of wheel arms 29 on which ground wheels 31 are journaled. Thus, whenever the wheel frame 24 is swung upwardly or downwardly relative to the planter frame 23, which may be done by conventional hydraulic cylinder means, the planting units 25 are raised and lowered into and out of transport and working positions. Each of the planter units 25 includes suitable seed furrow opener means (not shown). Each planter 21 also includes a forwardly extending draft frame 33 disposed in the longitudinal center line of the associated frame 23. The laterally outermost right and left hand planter units 25 have been omitted in FIG. 1 but they are shown in FIG. 7, which illustrates the transport arrangement of the tractor and planters 21 and will be referred to in detail later. The two planters 21 are interconnected by tie means 36 so that the laterally innermost planter units 25 (FIG. 1) will be maintained in the proper relationship so that the lateral distance between the planter units 25 of the two planters is substantially exactly equal to the desired row spacing.

As best shown in FIGS. 1 and 4, the tie means 36 comprises a pair of telescopically associated pipe sections 38 and 39, one receiving the other and the sections being secured in interconnected relation by a bolt or pin 41a. The laterally outer end of each of the pipe sections 38 and 39 carries a tubular sleeve 43 that is hingedly connected with the shaft or pin 44a that is removably disposed in a yoke 45 that is securely fixed to the associated planter by the bolts 46 that fix the lower portions of vertical frame members 47a to the adjacent transverse bar 48b associated therewith. The members 47a and the transverse bar 48b form portions of the planter frame 23. As will be seen from FIG. 4, when the telescopic pipe sections 38 and 39 are arranged as shown, the two planting implements 21 are held against lateral movement with respect to one another, whereby the proper row spacing between the inner planting units 25 of the two implements is maintained.

Referring now to FIGS. 1 and 3, the hitch means 20 comprises a generally transverse pipe member 41, a channel member 42, which is arcuate about point P, and a pair of fore-and-aft extending frame pipes 44, all rigidly interconnected as by welding or the like. The front ends of the fore-and-aft extending pipe members 44 are interconnected, as best shown in FIG. 3, by a transverse channel 47 and an upper transverse apertured plate section 48. There is a plate section 48 at each side of the forward central portion of the hitch frame 20, as will be seen from FIG. 1, and the plate sections 48 are welded to the front channel 47 and also to an intermediate channel 49 that is welded at its ends to the forward portions of the frame pipes 44. A pair of bracket receiving guides 52 are carried by the plates 48, only one of the guide members 52 being shown in FIG. 3. At the rear portion of the frame 20, the latter is reinforced by a cross brace 54 (FIG. 1) and the ends of the fore-and-aft extending frame members 44 are welded to an arcuate plate 55 (FIG. 5) that is welded to the rear face of the arcuate bar or channel 42, as will best be seen in FIGS. 5 and 6. From the latter figures it will be seen that the arcuate plate 55 extends above the upper flange of the arcuate channel 42.

Laterally shiftable from side to side along the arcuate frame channel 42 is a second arcuate bar 57, preferably in the form of a channel member 58 that is arcuate in concentric relation with respect to the arcuate frame 42, these parts being complementary in configuration, as will be seen from FIG. 1, the member 57 being shiftable about the center (P) of the circle along which the arcuate frame member 42 extends. The member 57 serves as an implement-receiving means and is connected in draft transmitting relation with the arcuate bar 42 by a pair of hitch brackets 61 and an associated pair of retaining brackets 62.

As will best be seen in FIG. 5, each of the hitch brackets 61 comprises a generally Z-shaped bar 63 welded to the top flange of the laterally shiftable arcuate channel 58, with a forward portion 64 extending across the frame channel 42 and the associated arcuate plate 55. The forward end 64 of each bracket 61 carries a roller 66 that is adapted to bear against the upper edge of the arcuate plate 55, rolling around the arcuate frame bar 42 when the arcuate bar 57 shifts toward one side or the other of the hitch frame 20. The retaining bracket means 62 comprises upper and lower bars 68 and 69 (FIG. 6) securely welded to the upper and lower flanges of the channel 42 and extending rearwardly across the laterally shiftable channel 58. A roller 71 is journalled for rotation by suitable bearing means carried by the rear ends of each pair of bracket plates 68 and 69, as best shown in FIG. 6. As best shown in FIG. 5, the rear arcuate channel 58 is supported rearwardly of the associated frame channel 42 by means of rollers 75 lying between the flanges of the channel 42 and carried on pins 76 fixed to the channel 58. Preferably one of the roller and pin means just mentioned is provided adjacent each hitch bracket 61, adjacent each pair of roller-carrying bars 68, 69, and at the central portion of the channel 58.

When the implements are assembled for planting, as best shown in FIG. 1, the second arcuate bar 57, and the two planters 21 form a framework which is not laterally shiftable. When it is desired to turn the tractor around the whole assembly, namely the second arcuate bar 57, the two planters 21, and the tie means 36, will shift relative to the tractor on the circular bar 42 about the center of curvature (P) of the bar 42. Thus the pivoting of the implement is about a point forward of the rear of the tractor, and such a construction requires less head land at the end of the rows than do other devices where the implements pivot about a point to the rear of the tractor.

The implement frame raising and lowering means will now be described.

Referring first to FIG. 1, a pair of chains 81 extend downwardly from the lift arms 13 of the tractor and at the lower ends are connected by suitable lug means to the adjacent portions of the frame bars 44. The guide lugs 52 mentioned above are shaped as shown in FIG. 3 and are adapted to cooperate with brackets 85 fixed at the upper ends, as by bolts 86, to the lower portions of the tractor and extending downwardly therefrom. Each bracket 85 includes a lower horizontal plate 88 that is apertured to receive a bolt 89. An extension 91 (FIGS. 1 and 8) includes an upper bar 94 that extends forwardly to the cross bar 54 to which it is welded.

The power lift arms 13 are utilized in raising the frame 20 from the ground up to its connection with the tractor. It will be noted that the forward frame member 41 is in the nature of a pipe or similar part and therefore backing of the rear wheels 12 of the tractor over the member 41 and into the space between the member 41 and the arcuate frame member 42 is facilitated, as may be readily seen in FIG. 1. When the tractor is in this position and the frame 20 is on the ground, the chains 81 are then connected to the lift arms 13 and the bars 44 rearwardly of the center of gravity of the frame structure 20, and therefore, with the chains connected, when the power lift is actuated to raise the lift arms, the rear portion of the frame 20 is raised first. This brings the extension 91 (FIG. 8) up against the drawbar 16 of the tractor. With the frame suspended on the chains 81, it is then a simple matter to insert the bolt 93 in the openings in the hitch extension 91 and the opening in the rear end of the drawbar 16. Next, additional lifting effort is exerted through the lift chains 81 connected to the frame bars 44 so as to raise the front end of the frame 20. This brings the plate 48 carrying the guides 52 up against the lower portions of the brackets 85. The guide lugs 52 serve to center the frame 20 in a lateral direction. The bolt 93 that is inserted in the rear section 91 and the tractor drawbar 16, properly positions the frame 20 in a fore-and-aft direction, thus accommodating the ready and convenient insertion of the attaching bolts 89 through the openings in the plate 48 and in the lower portions 88 of the brackets 85.

Thus, it is a simple matter requiring only a few minutes' time, to rigidly connect the hitch frame 20 to the tractor. It will be observed from FIGS. 1 and 2, that when so connected, the rear arcuate bar 57, to which the planters 21 are connected, is capable of shifting or sliding around the arcuate hitch frame channel 42 on the rollers 75 generally about a point of swinging that not only coincides with the center of curvature of the bar 42 but also is located generally centrally of the tractor and forward of the rear wheels 12 of the tractor. When so connected, as is well shown in FIGS. 1 and 2, the outfit is closely coupled and turning and maneuvering are facilitated.

Conventional four-row planters, such as the planters 21 described above, ordinarily carry marker arms at each side of the planter, each marker and its connections being like that shown in FIG. 1A. However, when the planters 21 are arranged for eight-row planting, in side by side relation, as shown in FIG. 1, the inside marker arms are removed from the planters, leaving only the laterally outer marker arms, one of which is shown in FIG. 1A.

Each of these marker arms comprises a channel bar 102 and a brace bar 101 suitably interconnected as at 103 at the outer ends and pivotally received on pivot means 104 carried by the U-shaped yoke or bracket 45, described above. At its outer end the main marker channel bar 102 carries a ground engaging marking element 106. The marker arms are raised and lowered whenever the furrow openers are raised and lowered and, moreover, are individually controlled by suitable latch means, not shown, and the latches are controlled by ropes or cables extending to the operator's station on the tractor.

According to this invention, where we make use of two conventional four-row planters to provide an eight-row implement, we make use also of the outer conventional four-row marker arms. As is illustrated in the upper left hand portion of FIG. 10, where the eight-row planter of this invention is shown in operation planting eight rows, the right hand marker arm 100 is lowered and makes mark M-1 along the ground a distance from the outermost row equal to 2½ times the row spacing, which is conventional disposition of the marking element for four-row planting. According to presently conventional practice, it is usually considered desirable to make a mark in the ground along which the center of the tractor can be driven on the next round. However, with eight-row planting, this would require a marker arm that would extend outwardly from the outermost previously planted row a distance equal to 4½ times the row spacing. This would entail a marker arm of excessive length and weight, and would therefore be difficult to maneuver. According to the present invention, as indicated above, we do not employ a marker arm of excessive weight, and would therefore be difficult to maneuver. According to the present invention, as indicated above, we do not employ a marker arm of excesive weight and length, but, instead employ a conventional marker arm as used with four-row planters. To do this, however, requires special mark-following means preferably mounted on the tractor. According to this invention, we provide a pair of forwardly extending bars 110, one at each side of the tractor, as shown in FIG. 1, and depending from the forwardmost end of each bar 110 is a mark following chain or similar element 111. The rear end of each bar 110 is connected to the frame 20 by means of the transverse bracket 112 welded to the forwardmost end portion of the arcuate bar 42 and extending laterally inwardly thereof, the inwardly extending portion being apertured to receive the associated bar 110. The rear end of each bar 110 is connected in any suitable way to a lug 115 carried by the adjacent portion of the transverse pipe member 41. Each bar 110 is so mounted as to dispose the mark-following element 111 substantially directly in line with the center line of the associated planter 21, or in other words a distance equal substantially to twice the row spacing from the center line of the tractor. Therefore, as illustrated in the lower right hand portion of FIG. 10, on the next ensuing round, the tractor is driven so that the mark-following element 111 follows along the mark M-1 made on the previous round, which mark is spaced from the adjacent planted row a distance equal to 2½ times the row spacing. As will be observed from FIG. 10, this places the eight planted rows in the proper position relative to the previously planted rows, with adjacent rows of each group spaced apart a distance equal to the desired row spacing. The mark-following elements 111 are carried a considerable distance forward of the operator station on the tractor, generally opposite the front wheel means so that the operator will have little difficulty in driving the tractor with the elements 111 following the previously formed mark, as will be seen from the lower right portion of FIG. 10.

Figure 10:
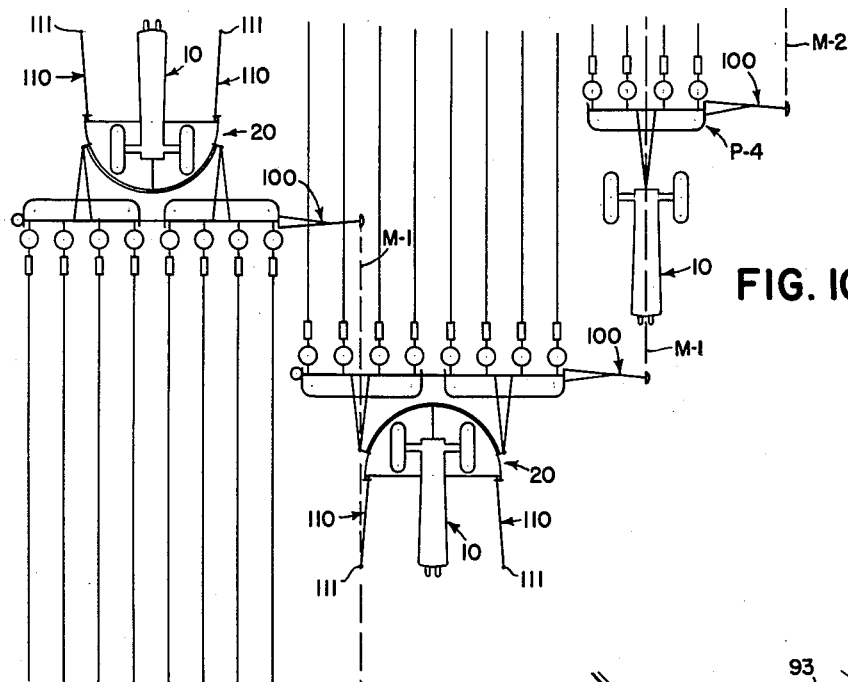
FIG. 10 is a plan view diagrammatic in nature illustrating the marker arrangement of this invention and the cooperating tractor-carried mark-following means, incorporated in this invention.

The present marking system, utilizing the conventional marker arms of a four-row tractor, has the advantage that an eight row planter having the marking means of our present invention is adapted for interchangeable use with conventional four-row planters, such as indicatetd in the upper right hand portion of FIG. 10. Here, the four-row planter P4 is driven with the center line of the tractor along the mark M-1 formed by the eight-row planter of this invention and plants four rows whose spacing is exactly like that of the eight row planter. Since the marker arms 100 on the planter P4 are those conventionally used with four-row planters, the marker M-2 formed by the four-row planter P4 may, if desired, be used by a following eight-row planter of this invention by causing the mark-following element 111 of the following planter to follow the mark M-2. Or, if another four-row planter is being used, another four-row planter may be used with planter P4 by driving the center of the tractor along the mark M-2. Thus, while not every farmer owning an eight-row planter constructed according to this invention will also own an additional four-row planter, for those farmers who own both types, it will readily be seen from FIG. 10 that those planters may be used together if desired and yet secure the desired uniform row spacing no matter in what sequence the two different sizes of implements are used.

It will be understood, of course, that the above references to specific numbers of planted rows, such as four rows or eight rows, is for purposes of illustration only. For example, it is possible that two six-row planters could be incorporated to form a twelve-row planter outfit, in which case conventional marker arms from the six-row planters would be used with the twelve row planter. The marking element and associated parts being so constructed, as illustrated in FIG. 1, that they are spaced outwardly from the center line of the tractor such a distance as to lie directly in front of the center line of the six-row planter units.

Figures 9, 11:
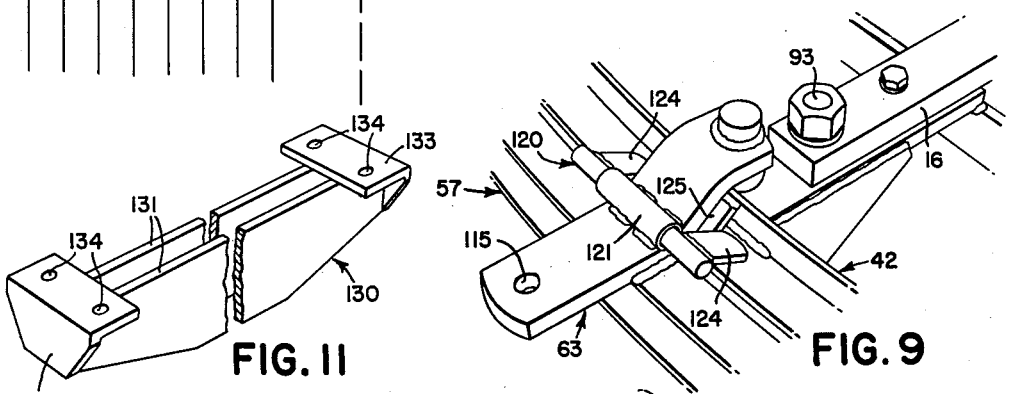
FIG. 9 is a fragmentary perspective view similar to FIG. 8 showing the two arcuate members of the hitch structure locked in their centered position.
FIG. 11 is a fragmentary perspective view of the drawbar reenforcing member.
Figure 8:
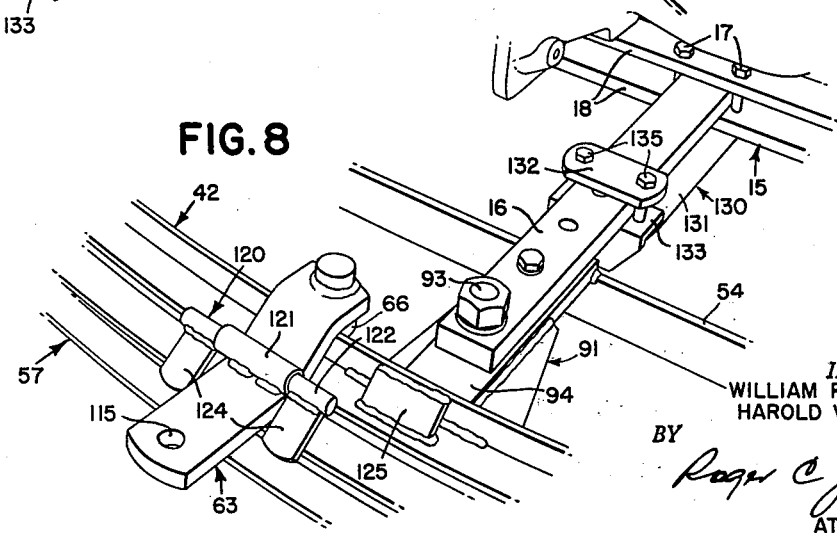
FIG. 8 is a fragmentary perspective view showing the rear portion of the hitch frame and associated parts and particularly the manner in which the rear portion of the hitch frame is carried on the tractor and, in addition, the means for locking the arcuate implement-receiving bar against lateral shifting movement.

As will be readily seen from FIGS. 1 and 2, an eight-row planting outfit is quite wide, and generally cannot safely be driven along roads or highways or through conventional farm gates and the like. Therefore, according to this invention, we provide means for hitching the two four-row planting units in tandem arrangement behind the tractor so that transport through relatively narrow spaces is readily accommodated. To this end, as best shown in FIGS. 8 and 9, we dispose one of the hitch brackets 63 at the center of the arcuate bar 57, the rear end of the bar 63 being apertured, as at 115, to receive the hitch frame 33 of the forward implement unit 21 when the latter is arranged directly behind the tractor. Further, for the forward implement 21, we provide an auxiliary hitch connection 117 (FIG. 7) that is attachable to the frame of the forward planter 21 and includes a hitch ring 118 to which the hitch frame 33 of the rear planter 21 may be directly connected. Thus, the two planter units are arranged in tandem behind the tractor in trailing relation.

When transporting the two four-row planters in tandem, and to hold the rear arcuate channel member 57 in centered position, we provide a latch mechanism 120 that includes a sleeve 121 welded to the center bracket 63 and receiving a cross shaft 122 to the ends of which latch arms 124 are fixed. The latch arms 124 are spaced apart so as to be disposable on opposite sides of a locking abutment 125 in the form of a small plate forming a stop part that is affixed to the forward arcuate channel member 42. As can be seen from FIG. 9, when the spaced apart lugs 124 are disposed on opposite sides of the stop part 125, the rear arcuate frame channel 57 is held against lateral shifting relative to the forward channel member 42 and this causes the two planters to trail centrally behind the tractor.

In order to reinforce the tractor drawbar 16 to enable it to sustain the loads imposed upon it by the frame channels 42 and 57 and associated parts, we provide a reinforcing structure 130 best shown in FIG. 11, that comprises a pair of laterally spaced apart fore-and-aft extending bars 131 disposed in vertical planes, respectively, and secured by clamp members 132 and 133 to the front and rear portions of the tractor drawbar at points fore and aft of the transverse drawbar support bars 18 (FIG. 8), the bars 131 being so fixed to the clamp parts as to clear the lower drawbar support member 18. The upper members 132 are in the form of plates and the lower members 133 are in the form of short angles. Both members are apertured, as at 134, to receive clamping belts 135.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. A hitch device for connecting an implement to a tractor having rear drive wheels, power lift means, and a rear drawbar, said hitch device comprising bracket means attachable to the generally intermediate portion of the tractor, a frame including an arcuate section, means to connect the generally central portion of the frame to the tractor power lift means whereby the latter when actuated lifts the front and rear portions of the hitch frame upwardly from the ground to a position for connection with the tractor, means to connect the frame to the tractor when the frame has been raised to said position so that said arcuate section encircles the tractor drive wheels and is disposed so that the center of curvature of said arcuate section lies forward of the rear end of the tractor, said means including means fixing the forward portion of said hitch frame to said bracket means and means fixing the rear portion of said arcuate section to the tractor drawbar, a member shiftable along said arcuate section from side to side relative to the tractor about said center of curvature, and means to connect said implement to said member.

2. A hitch device for connecting an implement to a tractor having rear drive wheels and power lift means, said hitch device comprising a frame including a rear arcuate bar, said bar being arcuate about a point located adjacent the forward portion of said frame, a transverse bar at the forward portion of the frame and joined to the forward end portions of said arcuate bar, said transverse bar being shaped to accommodate backing of the rear drive wheels of the tractor thereover, and said bars being spaced so that the tractor drive wheels may be disposed between said transverse bar and said arcuate bar, a pair of fore and aft extending laterally spaced apart bars fixed adjacent their forward ends to said transverse bar and at their rear ends to said arcuate bar, said laterally spaced apart bars carrying means adapted to be connected with the tractor power lift means, whereby operation of the latter serves to raise said frame, the forward ends of said laterally spaced apart bars extending forward of said transverse bar, and transverse bar means connecting with the forward ends of said laterally spaced apart bars and adapted to be connected with the tractor when said frame is raised.

3. A hitch device for connecting an implement to a tractor having rear drive wheels, a power lift means and a rear drawbar, said hitch device comprising an implement-receiving frame having a rear frame bar and a front transverse frame bar arranged so as to accommodate backing of the tractor drive wheels over the front bar into a position between the front and rear bars, means to connect the tractor power lift means with said frame at a point rearwardly of the center of gravity of the frame whereby when the power lift means is connected with said frame and is actuated the rear portion of the frame is raised first and is brought into engagement with the tractor drawbar, means to connect the frame to said drawbar when the frame is raised into connection therewith, continued movement of said power lift means serving to raise said transverse front bar generally about the tractor drawbar as a fulcrum so as to bring said transverse bar up into a position to be connected with the tractor forward of said drive wheels, and means to connect said transverse bar with the tractor when said transverse bar is raised into said position.

4. A hitch device for connecting an implement to a tractor having rear drive wheels, said hitch device comprising a frame including an arcuate section, means to connect the frame to the tractor so that said arcuate section encircles the tractor drive wheels, a member comprising a second arcuate section concentric with respect to said first arcuate section, means shiftably supporting said second section on said first section for generally lateral movement relative thereto, and latch means releasably locking said second section to said first section to optionally prevent said lateral movement, said latch means including a part swingable between a first position generally at one side of an axis of swinging and a second position generally at the other side of said axis, whereby the weight of said latch part serves to hold said part in either position.

5. A hitch device for connecting an implement to a tractor having rear drive wheels, power lift means, and a rear drawbar, said hitch device comprising a frame including an arcuate section, means to connect the tractor power lift means with said frame at a point rearwardly of the center of gravity of the frame whereby when the power lift means is connected with said frame and is actuated, the rear portion of the frame is raised first and is brought into engagement with the tractor drawbar, means to connect the rear portion of the frame to said drawbar when the frame is raised into connection therewith, continued movement of said power lift means after the rear portion of the frame has been connected to the drawbar serving to raise the front portion of the frame generally about the tractor drawbar as a fulcrum so as to bring the front portion up into a position to be connected with the tractor forward of said drive wheels, means to connect said front portion with the tractor when said front portion is raised into said position, a member shiftable along said arcuate section from side to side relative to the tractor about said center of curvature, and means to connect said implement to said member.

6. In combination with a pair of implements, a hitch device for connecting the pair of implements in generally side-by-side relation to a tractor, the implements when hitched to the tractor being swingable with a portion of said hitch device about a point lying forward of the rear portion of the tractor, each of said implements comprising a transversely elongated structure and a forwardly extending draft frame, said implements being coupled together by means interconnecting adjacent ends of the transversely elongated structures and adapted to swing about a substantially horizontal axis, said hitch device comprising a frame adapted to be carried by the tractor, a first curved bar mounted on the frame and arcuate about a point lying forward of the rear portion of the tractor when said frame is connected thereto, a second arcuate bar shiftably connected to said first arcuate bar and having substantially the same degree of curvature as said first bar and shiftable relative to the latter about said point, said second arcuate bar being disposed on the outside of said first arcuate bar, and a bracket on each end of said second arcuate bar, each of said brackets having a first portion extending generally radially inwardly across said first arcuate bar, the inner end of each of said first portions carrying rollers which are engageable with the radially inner face of said first arcuate bar, and each of said brackets having a second portion extending generally radially outwardly, each of said second portions being connected to an implement.

7. In combination with a tractor having laterally spaced apart rear drive wheels and a pair of implements, a hitch device for connecting the pair of implements to the tractor, each of said implements comprising a transversely elongated structure and a forwardly extending draft frame disposable alongside but laterally outward of each of the tractor drive wheels, said implements being coupled together by means interconnecting adjacent ends of transversely elongated structures and adapted to swing about a substantially horizontal axis, said hitch device including an arcuate frame, means fixing the arcuate frame to the tractor so that the center of arcuation of said frame lies generally between said tractor drive wheels, means connecting the forward portions of said draft frames with said arcuate frame for arcuate movement relative thereto about said center, each of said last mentioned connecting means including a part pivoted at its laterally outer portion to the forward end of each of said draft frames, means connecting the laterally inner portion of each of said parts to said arcuate frame for shifting movement generally about said center, and means interconnecting intermediate portions of said parts whereby said shifting movement of one of said parts will cause the other part to shift.

References Cited in the file of this patent

UNITED STATES PATENTS

| | | |
|---|---|---|
| 971,157 | Smith | Sept. 27, 1910 |
| 1,888,502 | Holstein | Nov. 22, 1932 |
| 2,062,282 | Acton | Dec. 1, 1936 |
| 2,130,860 | Sanderson | Sept. 20, 1938 |
| 2,144,295 | McGregor | Jan. 17, 1939 |
| 2,178,467 | Brent | Oct. 31, 1939 |
| 2,306,231 | Smith et al. | Dec. 22, 1942 |
| 2,376,464 | White | May 22, 1945 |
| 2,414,248 | Townsend | Jan. 14, 1947 |
| 2,692,150 | Maier | Oct. 19, 1954 |
| 2,710,200 | French | June 7, 1955 |
| 2,791,444 | McNeice | May 7, 1957 |

FOREIGN PATENTS

| | | |
|---|---|---|
| 108,534 | Australia | Sept. 12, 1939 |